US006723758B2

(12) United States Patent
Stone et al.

(10) Patent No.: US 6,723,758 B2
(45) Date of Patent: Apr. 20, 2004

(54) GRAFT POLYMERIC MEMBRANES AND ION-EXCHANGE MEMBRANES FORMED THEREFROM

(75) Inventors: Charles Stone, West Vancouver (CA); Alfred E. Steck, West Vancouver (CA); Biswajit Choudhury, Surrey (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/934,176

(22) Filed: Aug. 21, 2001

(65) Prior Publication Data

US 2002/0137806 A1 Sep. 26, 2002

Related U.S. Application Data

(63) Continuation-in-part of application No. 09/503,760, filed on Feb. 14, 2000, now abandoned, which is a continuation-in-part of application No. 08/967,960, filed on Nov. 12, 1997, now Pat. No. 6,359,019.

(51) Int. Cl.$^7$ .............................. C08J 5/22; C08J 5/20; C08F 8/00; C08F 8/36

(52) U.S. Cl. ............................ 521/27; 521/31; 521/32; 521/33; 525/359.1; 525/416

(58) Field of Search ............................ 521/27, 32, 33; 525/359.1, 416

(56) References Cited

U.S. PATENT DOCUMENTS

| | | | |
|---|---|---|---|
| 3,341,366 A | 9/1967 | Hodgdon, Jr. et al. | |
| 4,012,303 A | 3/1977 | D'Agostino et al. | |
| 4,113,922 A | 9/1978 | D'Agostino et al. | 429/33 |
| 4,140,815 A | 2/1979 | Dege et al. | 427/44 |
| 4,169,023 A | 9/1979 | Sata et al. | 204/98 |

(List continued on next page.)

FOREIGN PATENT DOCUMENTS

| | | |
|---|---|---|
| EP | 0 140 544 | 5/1985 |
| JP | 60-110711 | 6/1985 |
| WO | WO 95/08581 | 3/1995 |
| WO | WO 96/40798 | 12/1996 |
| WO | WO 97/25369 | 7/1997 |
| WO | WO 99/24497 | 5/1999 |

OTHER PUBLICATIONS

Momose and Yoshioka, "Radiation Grafting of α, β, β–Trifluorostyrene onto Poly(ethylene–tetrafluoroethylene) Film by Preirradiation Method. II. Properties of Cation–Exchange Membrane Obtained by Sulfonation and Hydrolysis of the Grafted Film," *Journal of Applied Polymer Science, 38:* 2091–2101, 1989.

Hodgdon et al., "Note: Preparation and Polymerizability of Substituted alpha, beta, beta–Trifluorostyrenes", *Journal of Polymer Science: Part A–1,* vol. 6, pp. 711–717 (1968).

Babie et al., "Kinetics of Diffusion–Free Radiation Graft Polymerization of Styrene onto Polyethylene", *Journal of Polymer Science: Polymer Chemistry Edition,* vol. 15, pp. 469–488. (1977).

Babie et al. "Study of Energy Transfer to Solvent in Radiation Graft Polymerization of Styrene onto Poyethylene", *Journal of Polymer Science: Polymer Chemistry Edition,* vol. 15, pp. 1619–1628 (1977).

Momose et al. "Radiation Grafting of α,β,β–Trifluorostyrene onto Various Polymer Films by Preirradiation Method", *Journal of Applied Polymer Science,* vol. 37, pp. 2165–2168 (1989).

Momose et al. "Radiation Grafting of α,β,β–Trifluorostyrene onto Poly(Ethylene–Tetrafluoroethylene) Film By Preirradiation Method. I. Effects of Preirradiation Dose Monomer Concentration, Reaction Temperature, and Film Thickness", *Journal of Applied Polymer Science,* vol. 37, pp. 2817–2826 (1989).

Momose et al. "Radiation Grafting of α,β, β–Trifluorostyrene onto Poly(Ethylene–Tetrafluoroethylene) Film By Preirradiation Method. III. Properties of Anion–Exchange Membrane Obtained by Chloromethylation and Quaternization of the Grafted Film", *Journal of Applied Polymer Science,* vol. 39, pp. 1221–1230 (1989).

Scherer et al. "Radiation Grafted Membranes: Some Structural Investigations In Relation to Their Behavior in IonExchange Membrane Water Electrolysis Cells", *Int. J. Hydrogen Energy,* vol. 17, No. 2, pp. 115–123 (1992).

Guzman–Garcia et al. "Analysis of radiation–grafted membranes for fuel cell electrolytes", *J. Applied Electrochem.,* vol. 22, pp. 204–214 (1992).

Rouilly et al. "Proton exchange membranes prepared by simultaneous radiation of styrene onto Teflon–FEP films. Synthesis and Characterization", *J. Membrane Sci.,* 81, pp. 89–95 (1993).

Gupta et al. "Cation Exchange Membranes by Pre–Irradiation Grafting Of Styrene onto FEP Films. I. Influence of Synthesis Conditions", *J. Polymer Sci.: Part A: Polymer Chemistry,* vol. 32, pp. 1931–1937 (1994).

Gupta et al. "Proton–Exchange Membranes by Radiation Grafting of Styrene onto FEP Films. II. Mechanism Of Thermal Degradation in Copolymer Membranes", *J. Applied Polymer Sci.,* vol. 51, pp. 1659–1666 (1994).

Nikitina, T.S., "αββ–Trifluorostyrene and polymers based on it," *Russian Chemical Reviews* 59(6): 575–589, 1990.

*Primary Examiner*—Bernard Lipman
(74) *Attorney, Agent, or Firm*—Seed IP Law Group PLLC (57) ABSTRACT

Graft polymeric membranes and methods for making graft polymeric membranes have one or more trifluorovinyl aromatic monomers that are radiation graft polymerized to a polymeric base film. The membranes comprise a polymeric base film to which has been graft polymerized substituted α,α,β-trifluorostyrene and/or α,α,β-trifluorovinylnaphthylene monomers, which are activated towards graft polymerization. As ion-exchange membranes, the membranes are suitable for use in electrode apparatus, including membrane electrode assemblies in, for example, fuel cells. The membranes can also be crosslinked.

10 Claims, 2 Drawing Sheets

U.S. PATENT DOCUMENTS

| | | | |
|---|---|---|---|
| 4,262,041 A | 4/1981 | Eguchi et al. | 427/245 |
| 4,420,612 A | 12/1983 | Aiba et al. | 536/102 |
| 4,506,035 A | 3/1985 | Barnett et al. | 521/53 |
| 4,605,685 A | 8/1986 | Momose et al. | 522/124 |
| 5,049,253 A | 9/1991 | Izuo et al. | 204/301 |
| 5,140,074 A | 8/1992 | DeNicola, Jr. et al. | 525/263 |
| 5,420,200 A | 5/1995 | Konig et al. | 525/68 |
| 5,422,411 A | 6/1995 | Wei et al. | 526/243 |
| 5,498,639 A | 3/1996 | Wei et al. | 521/27 |
| 5,602,185 A | 2/1997 | Stone et al. | 521/27 |
| 5,656,386 A | 8/1997 | Scherer et al. | 429/33 |
| 5,684,192 A | 11/1997 | Stone et al. | 562/826 |
| 5,777,038 A | 7/1998 | Nishikawa et al. | 525/295 |
| 5,817,718 A | 10/1998 | Nezu et al. | 525/64 |
| 5,830,962 A | 11/1998 | Feirig et al. | 526/243 |
| 5,863,994 A | 1/1999 | DeNicola, Jr. et al. | 526/74 |
| 6,359,019 B1 | 3/2002 | Stone et al. | 521/27 |

GRAFT POLYMERIC MEMBRANES AND ION-EXCHANGE MEMBRANES FORMED THEREFROM

CROSS-REFERENCE TO RELATED APPLICATION(S)

This application is a continuation-in-part of U.S. patent application Ser. No. 09/503,760 filed on Feb. 14, 2000 now abandoned, which is a continuation-in-part of U.S. patent application Ser. No. 08/967,960 filed on Nov. 12, 1997 now U.S. Pat. No. 6,359,019, entitled "Graft Polymeric Membranes and Ion-Exchange Membranes Formed Therefrom". The '760 and '960 applications, which are incorporated herein by reference in their entirety, describe polymeric compositions comprising a polymeric base film to which has been radiation grafted one or more of a variety of substituted trifluorovinyl aromatic monomers. These compositions are suitable for use as membranes, particularly as ion-exchange membranes.

FIELD OF THE INVENTION

The present invention relates to graft polymeric membranes in which one or more trifluorovinyl aromatic monomers are radiation graft polymerized to a polymeric base film, and methods for making same wherein the grafted polymeric chains are modified to incorporate ion-exchange groups. The resultant membranes are useful in dialysis applications, and particularly in electrochemical applications, for example as membrane electrolytes in electrochemical fuel cells and electrolyzers.

BACKGROUND OF THE INVENTION

The preparation of graft polymeric membranes by radiation grafting of a monomer to a polymeric base film has been demonstrated for various combinations of monomers and base films. The grafting of styrene to a polymeric base film, and subsequent sulfonation of the grafted polystyrene chains has been employd to prepare ion-exchange membranes.

U.S. Pat. No. 4,012,303, reports the radiation grafting of $\alpha,\beta,\beta$-trifluorostyrene (TFS) to polymeric base films using gamma ray co-irradiation, followed by the introduction of various ion-exchange substituents to the pendant aromatic rings of the grafted chains. With co-irradiation, since the TFS monomer is simultaneously irradiated, undesirable processes such as monomer dimerization and/or independent homopolymerization of the monomer may occur in competition with the desired graft polymerization reaction.

U.S. Pat. No. 4,012,303 also reports that the TFS monomer may be first sulfonated and then grafted to the base film. Thus, the introduction of ion-exchange groups into the membrane can be done as part of the grafting process, or in a second step.

More recently, the grafting of TFS to pre-irradiated polymeric base films, followed by the introduction of various substituents to the pendant aromatic rings of the grafted chain has been reported in U.S. Pat. No. 4,605,685. Solid or porous polymeric base films, such as for example polyethylene and polytetrafluoroethylene, are pre-irradiated and then contacted with TFS neat or in solution. Pre-irradiation is reportedly a more economic and efficient grafting technique, reportedly giving a percentage graft of 10–50% in reaction times of 1–50 hours. Aromatic sulfonation, haloalkylation, amination, hydroxylation, carboxylation, phosphonation and phosphorylation are among the reactions subsequently employd to introduce ion-exchange groups into the grafted polymeric chains. Levels of post-sulfonation from 40% to 100% are reported.

In either case the prior art TFS-based grafted membranes incorporate statistically a maximum of one functional group per monomer unit in the grafted chain. Further, they typically incorporate only one type of functional group as substituents on the pendant aromatic rings in the grafted chains.

In the present membranes, one or more types of substituted TFS monomers and/or substituted $\alpha,\beta,\beta$-trifluorovinylnaphthylene (TFN) monomers are grafted to polymeric base films, the substituents being selected to offer particular advantages, for example:

(a) Substituted TFS and/or TFN monomers that are activated have increased reactivity in the grafting reaction facilitating graft polymerization. By "activated" it is meant that either the percentage graft yield of the graft polymerization reaction is increased, or that the rate of the reaction is increased, in reactions employing the substituted monomers relative to reactions employing unsubstituted monomers.

(b) Substituted TFS and/or TFN monomers in which the substituents are activating with respect to the grafting reaction, but which can be converted so as to be de-activating with respect to subsequent reactions to introduce, for example, ion-exchange functionality into the grafted chains, and thereby permit the introduction of ion-exchange groups that are more stable under certain conditions.

(c) Substituted TFS and/or TFN monomers in which the substituents are activating with respect to the grafting reaction, but which can be converted so as to be de-activating after introduction of ion-exchange functionality into the grafted chains.

(d) Grafted chains comprising monomer units with more than one aromatic ring permit the introduction of more than one ion-exchange group per grafted monomer unit, enabling the achievement of higher ion-exchange capacities at lower percentage grafts than in prior art grafted polymeric membranes.

(e) Substituted TFS and/or TFN monomers in which the substituents are precursors to ion-exchange groups may be transformed to ion-exchange groups after the grafting reaction, and can facilitate the introduction of more than one type of ion-exchange group into the grafted chains, for example, so that both cation and anion-exchange groups may be incorporated in a membrane.

(f) Substituted TFS and/or TFN monomers in which the substituents contain functionality that can be further reacted to allow for the preparation of crosslinked graft polymeric membranes that may display, for example, greater dimensional stability under certain conditions than similar graft polymeric membranes that are not crosslinked.

SUMMARY OF THE INVENTION

A graft polymeric membrane is provided in which one or more types of trifluorovinyl aromatic monomers are graft polymerized to a polymeric base film. In one embodiment, the membrane comprises a polymeric base film to which has been graft polymerized a monomer (meaning at least one type of monomer) selected from the group consisting of monomers of the following formulae (I) and (II):

and where $A_1$, $A_2$, and $B_1$, $B_2$ are independently selected from the group consisting of hydrogen, lower alkyl, lower fluoroalkyl, cyclic alkyl, cyclic amine, cyclic ether, cyclic thioether, Ar (with the proviso that where one of $A_1$ and $A_2$ is hydrogen, Ar is other than Ph), CH(X)Ph, where X is selected from the group consisting of hydrogen, fluorine, lower alkyl, lower fluoroalkyl and Ph, PRR' and P(OR)(OR'), where R and R' are independently selected from the group consisting of lower alkyl, cyclic alkyl and Ph, and where R and R' can be the same or different); and, wherein $A_1$, $A_2$, $B_1$, and $B_2$ can be the same or different, provided that in the selected monomer at least one of the substituents $A_1$, $A_2$, $B_1$, $B_2$ is other than hydrogen. In other words there is at least one of the foregoing substituted monomers employd in the graft polymerization reaction. The selected substituted monomer(s) may have one or two non-hydrogen substituents.

Of the listed alkyl substituents, lower alkyl and cyclic alkyl are generally preferred, with methyl (Me) being most preferred. Thus, membranes where one or both substituents on the selected monomer of formula (I) or (II) are Me are particularly preferred, with para-Me being the most desirable substitution position in formula (I)). In these embodiments the base film preferably comprises poly(ethylene-co-tetrafluoroethylene).

In embodiments in which a polymeric base film has been graft polymerized with a monomer of formula (I) in which $A_1$ is Ar and $A_2$ is hydrogen, Ar is preferably a fused polycyclic aromatic with two fused rings, biphenyl, or a heteroaromatic group with at least one heteroatom that is preferably nitrogen, oxygen or sulfur. If the heteroaromatic group contains more than one heteroatom, the heteroatoms may be the same or different. If one of the heteroatoms is nitrogen it may be advantageously N-alkylated or N-benzylated for certain membrane applications. Monocyclic heteroaromatics are generally preferred over polycyclic heteroaromatics.

The above graft polymeric membrane may comprise a single monomer, whereby the grafted chains are homopolymeric, or may comprise more than one monomer such that the grafted chains are copolymeric. For example, the graft polymeric membrane may comprise more than one monomer of formula (I) having different $A_1$ and/or $A_2$ substituents, more than one monomer of formula (II) having different $B_1$ and/or $B_2$ substituents, more than one monomer of either formula (I) or formula (II) having the same substituents located at different positions, or monomers of both formula (I) and (II), such that the grafted chains are copolymeric.

In another embodiment of the present graft polymeric membrane, the membrane comprises a polymeric base film to which has been graft polymerized, with the foregoing monomers, a monomer of the following formula (III):

where D is selected from the group consisting of hydrogen, fluorine, $CF_3$, $CF_2H$, $CF=CF_2$, $SO_2F$ and $SO_3^- M^+$.

Embodiments of the present graft polymeric membrane comprise a polymeric base film with grafted chains comprising monomer units selected from the group consisting of monomer units of the following formulae (IV) and (V), wherein at least a portion of the monomer units further optionally comprise at least one ion-exchange substituent, in which case the membrane is an ion-exchange membrane:

—$CF_2$—CF— and where, as before, $A_1$, $A_2$, and $B_1$, $B_2$ are independently selected from the group consisting of hydrogen, lower alkyl, lower fluoroalkyl, cyclic alkyl, cyclic amine, cyclic ether, cyclic thioether, Ar (with the proviso that where one of $A_1$ and $A_2$ is hydrogen, Ar is other than Ph), CH(X)Ph, where X is selected from the group consisting of hydrogen, fluorine, lower alkyl, lower fluoroalkyl and Ph, PRR' and P(OR) (OR'), where R and R' are independently selected from the group consisting of lower alkyl, cyclic alkyl and Ph, and where R and R' can be the same or different); and wherein $A_1$, $A_2$, $B_1$, and $B_2$ can be the same or different, provided that at least one of the substituents $A_1$, $A_2$ is other than hydrogen. The foregoing membranes may be formed by grafting monomers to a polymeric base film, or by grafting to some other form of polymeric substrate and then forming the grafted material into a membrane. In some embodiments of the ion-exchange membranes, statistically at least 50% of the monomer units in the grafted chains have at least one ion-exchange substituent per monomer unit. In other embodiments at least a portion of the monomer units comprise more than one ion-exchange substituent, and/or portion of the grafted chains may comprise at least two different types of ion-exchange groups, which may even include both anion and cation exchange groups. The ion-exchange substituent most typically incorporated is a sulfonate or sulfonic acid group.

In preferred embodiments one or both substituents of the monomer units of formulae (IV) or (V) are CH(X)Ph, where X is selected from the smaller group consisting of hydrogen, fluorine, Me and Ph, or Me, with para-Me being the most desirable substitution position for the Me group in units of formula (IV). In these embodiments, again, the base film preferably comprises poly(ethylene-co-tetrafluoroethylene).

The grafted chains of ion-exchange membrane may further comprise additional monomer units, such as for example, units of formula (VI):

(VI)

where D is selected from the group consisting of hydrogen, fluorine, $CF_3$, $CF_2H$, $CF=CF_2$, $SO_2F$ and $SO_3^- M^+$.

The ion-exchange membrane may be substantially gas impermeable. Such impermeable ion-exchange membranes may be incorporated into an electrode apparatus such as, for example, a membrane electrode assembly. Electrochemical fuel cells that comprise such ion-exchange membranes are also provided. For fuel cell applications, the polymeric base film of the ion-exchange membrane is preferably less than 100 µm thick.

In the present graft polymeric membranes or ion-exchange membranes, at least a portion of the grafted chains may be crosslinked.

Other membranes may be prepared from those membranes described above by subjecting them to a reaction process selected from the group consisting of, for example, halomethylation, sulfonation, phosphonation, amination, carboxylation, hydroxylation and nitration. Membranes so prepared may be useful ion-exchange membranes or precursors to ion-exchange membranes. Methods of preparing the present membranes and ion-exchange membranes are also provided.

Ion-exchange membranes may be prepared by a method which comprises graft polymerizing to a polymeric base film a monomer selected from the group consisting of monomers of formulae (I) and (II) described above, wherein in the selected monomer(s) at least one of the substituents $A_1$, $A_2$, and $B_1$, $B_2$ is a non-hydrogen substituent which activates the monomer with respect to graft polymerization (relative to the corresponding unsubstituted monomer). The method further comprises introducing a sulfonate group (or other ion-exchange group) into at least a portion of the graft polymerized monomer units and converting at least a portion of the non-hydrogen substituents to substituents which are deactivating with respect to desulfonation (relative to the unsubstituted monomer unit). The conversion of the non-hydrogen substituent to a deactivating group may be performed before or after introduction of the sulfonate group into the grafted units.

Some of the membranes described above may be prepared by a method comprising graft polymerizing to a polymeric base film a substituted monomer selected from the group consisting of monomers of formulae (I) and (II) described above, wherein $A_1$, $A_2$, and $B_1$, $B_2$ are as described above.

In preferred embodiments of this method, $A_1$ and $B_1$ are independently selected from the group consisting of:

Ar, where Ar is selected from the group consisting of monocyclic heteroaromatics, fused polycyclic heteroaromatics, and heteroaromatic ring assemblies having at least one nitrogen atom);

cyclic amine; and phosphines of the formula PRR' and phosphites of formula P(OR) (OR'), where R and R' are independently selected from the group consisting of lower alkyl, cyclic alkyl and Ph, and where R and R' can be the same or different); and $A_2$ and $B_2$ are hydrogen.

The method further comprises alkylating or benzylating at least a portion of any of the nitrogen atoms of the Ar group, the nitrogen atoms of the cyclic amine, or the phosphorus atoms of the phosphine or phosphite.

In other embodiments where $A_1$ and $B_1$ are independently selected from the group consisting of phosphines of the formula PRR' and phosphites of formula P(OR) (OR'), where R and R' are independently selected from the group consisting of lower alkyl, cyclic alkyl and Ph, and where R and R' can be the same or different), and $A_2$ and $B_2$ are hydrogen, the method may further comprise the sequential steps of introducing a nitro group into at least a portion of the monomer units of the membrane and converting at least a portion of those nitro groups to quaternary ammonium groups. This method optionally further comprises subsequently converting said phosphine or phosphite to an ion-exchange substituent.

In still another embodiment, the present method comprises graft polymerizing to a polymeric base film a monomer selected from the group consisting of monomers of the formulae (I) and (II) described above, but where $A_1$ and $B_1$ are independently selected from the group consisting of PRR', P(OR) (OR'), and SR, where R and R' are independently selected from the group consisting of lower alkyl, cyclic alkyl and Ph, and where R and R' can be the same or different), and $A_2$ and $B_2$ are the same as $A_1$ and $B_1$ respectively or hydrogen. The method comprises the steps of graft polymerizing the monomers to a polymeric base film, and oxidizing at least a portion of the PRR', P(OR) (OR'), or SR groups to produce phosphine oxides, phosphones, phosphonates, sulfoxides, or sulfones. The method may further comprise introducing ion-exchange substituents into at least a portion of said monomer units, before or after the oxidation step. Where $A_1$ and $B_1$ are independently selected from the group SR, where R is selected from the group consisting of lower alkyl, cyclic alkyl and Ph, and $A_2$ and $B_2$ are the same as $A_1$ and $B_1$ respectively or hydrogen, the method optionally further comprises converting at least a portion of the SR groups to sulfonate or sulfonic acid groups.

In the above-described embodiments the substrate for the graft polymerization is preferably a polymeric base film. However, the polymeric substrate may be in other forms such as, for example, a powder or in solution, or the substrate may be an oligomer in any form. Where the substrate is not in the form of a film an additional step will be required to form the grafted material into a membrane. Where the substrate is in solution an additional solvent removal step will be required.

DETAILED DESCRIPTION OF PREFERRED EMBODIMENT(S)

As used in this description and in the appended claims, in relation to substituents of TFS and/or TFN monomers, lower alkyl means straight chain or branched $C_1$–$C_6$ alkyl groups. Lower fluoroalkyl means fluorinated straight or branched $C_1$–$C_6$ saturated chains, provided that the benzylic carbon has no more than one fluorine atom attached thereto. In preferred embodiments, the lower alkyl and lower fluoroalkyl are $C_1$–$C_4$. Other haloalkyls of the same general description may also be employed in the present membrane; however, fluorine is preferred due to the relative lability of chlorine, bromine and iodine to substitution, which may result in competition in other reaction processes or in undesirable side reactions. Cyclic alkyl means cyclic alkyls having $C_3$–$C_7$ rings. Cyclic amine means nonaromatic heterocyclic 2° or 3° amines having 3–7 atoms in the ring (for example, piperidine, piperazine, and quinuclidene). Cyclic ether means nonaromatic heterocyclic ethers having 3–7 atoms in the ring (for example, tetrahydrofuran and dioxane). Cyclic thioether means nonaromatic heterocyclic thioethers having 3–7 atoms in the ring (for example, tetrahydrothiophene and dithiane). Aryl group, unless otherwise stated, means: monocyclic aromatic rings; fused polycyclic hydrocarbons containing at least one aromatic ring (for example, indan); fused polycyclic aromatic hydrocarbons (for example, indene and naphthalene); aromatic ring assemblies (for example, biphenyl); and heteroaromatics thereof, wherein the heteroatoms are nitrogen, oxygen, or sulfur, and the heterocyclic may contain more than one heteroatom, and may also contain different species of heteroatom (for example, indoline, pyrrole, pyridine, oxathiazine, and purine ). The abbreviation Me is used to represent a methyl group, and Ar is used to represent an aryl group. The abbreviation Ph is used to represent a phenyl group. The formula $SO_3^-M^+$ represents sulfonate salts, where $M^+$ may be any suitable counterion, such as, for example, metal cations and quaternary ammonium ions.

Suitable substituents for TFS and/or TFN monomers that are activating in graft polymerization reactions include, for example: lower alkyls; lower fluoroalkyls; cyclic alkyls; cyclic amines; cyclic ethers; cyclic thioethers; Ar groups; and, phosphines, phosphites, and thioethers. Substituents may be coupled to the aromatic rings of TFS and/or TFN monomers in any position. Meta- and para-substituted monomers are preferred, with para-substituted monomers being more preferred.

Any radiation capable of introducing sufficient concentrations of free radical sites on and within the base polymeric film may be employd in the preparation of the grafted polymeric membranes described herein. For example, the irradiation may be by gamma rays, X-rays, electron beam, or high-energy UV radiation. Electron beam irradiation is generally preferable as the process times are short and thus more suited to high volume production processes. The decay of the source and typically longer reactions times required with gamma-ray radiation tend to render it less suitable for high volume manufacturing processes.

The polymeric base film may be pre-irradiated prior to bringing it into contact with the monomer or monomer mixture to be grafted or the substrate and monomer(s) may be irradiated together (co-irradiation).

For the preparation of membranes, grafting to a polymeric base film is generally more efficient and cost-effective than grafting to a substrate in some other form such as a powder and then forming a membrane from the grafted material.

The preferred polymeric base film material is dependent on the application in which the grafted membrane is to be employd. The base film may be a porous or dense film. Preferred substrate materials for electrochemical applications, for example, include hydrocarbons such as polyolefins, especially polyethylene and polypropylene. In some applications, a perfluorinated or partially fluorinated polymeric base film may be employd, for example, polytetrafluoroethylene (PTFE), poly(tetrafluoroethylene-co-hexafluoropropylene), polyvinylidene fluoride, and preferably poly(ethylene-co-tetrafluoroethylene).

In the grafting reaction, the polymeric base film is treated with the monomer(s) in the liquid phase, either as a neat liquid or in a solution. Alternatively, the polymeric base film may be treated with a mixture of liquid and vapor phase monomer(s) (including aerosols), or with monomer(s) in the vapor phase only. It can be advantageous to select a solvent that will cause the solution to penetrate the base film and cause it to swell. This facilitates grafting of the monomer(s) throughout the membrane thickness. Preferably the irradiation and grafting process is carried out in an inert atmosphere.

The reaction conditions may be selected so as to introduce crosslinking between monomer units during graft polymerization or subsequent thereto. Crosslinking may be introduced into polymeric membranes where it is, for example, desirable to increase dimensional stability, reduce swelling, modify chemical and/or mechanical properties, or enhance the ion-exchange efficiency. Methods of preparing crosslinked graft polymeric membranes are known in the art. For example, U.S. Pat. No. 5,656,386 describes adding a crosslinking agent to vinyl monomers to be grafted to a membrane film, wherein the radiation grafting and crosslinking reactions occur simultaneously.

In the present graft polymeric membranes, the constituent monomers may be selected so as to be capable of forming crosslinks without requiring the addition of a separate crosslinking agent. If crosslinking is desirable, the monomer (s) preferably contains functionality that can be crosslinked. For example, monomers having a t-butyl group as a substituent would be less appropriate, since such substituents do not participate readily in crosslinking reactions. As another example, monomers having —$CHF_2$ or —$CH(CF_3)_2$ substituents are capable of forming very stable crosslinks, but such monomers may be so de-activating towards polymerization that the percentage graft or rate of grafting may fall to an undesirable level. However, such monomers may be suitably employed in the grafting reaction provided they are included in the monomer mixture at a relatively low mole percentage (for example, less than about 10 mol %).

For the preparation of grafted ion-exchange membranes from substituted TFS and/or TFN monomers, substituents that are activating with respect to the polymerization reaction are typically also activating towards subsequent reactions to introduce ion-exchange groups, such as, for example, halomethylation, sulfonation, phosphonation, amination, carboxylation, hydroxylation (optionally combined with subsequent phosphorylation) and nitration. Although the presence of an activating substituent may be beneficial in that it may facilitate the introduction of the ion-exchange group into the monomer, where the ion-exchange group is sulfonate, for example, there may also be a disadvantage. This is because sulfonation is a macroscopically reversible process, so a substituent that is activating with respect to the introduction of a sulfonate group may also make the sulfonate group less stable under certain conditions, thereby facilitating desulfonation of the monomer unit.

In an embodiment of the present membranes or method, the substituted TFS and/or TFN monomers to be grafted contain a phosphine, phosphite, or thioether substituent. These substituents are activating with respect to the graft polymerization reaction. Ion-exchange groups such as, for example, sulfonate, may then be introduced into the aromatic ring of the substituted TFS and/or TFN monomer units after graft polymerization. Then, following graft polymerization the phosphine, phosphite or thioether groups can be oxidized to produce phosphine oxides, phosphones, phosphonates, sulfoxides, or sulfones. Methods suitable for such oxidations are well known to those skilled in the art. The resulting phosphine oxides, phosphones, phosphonates, sulfoxides and/or sulfones are de-activating, thus making the introduced ion-exchange groups, in particular sulfonate groups, more stable under certain conditions.

In addition, these substituents may allow for the introduction of additional ion-exchange functionality into the TFS and/or TFN monomer units. For example, oxidation of the phosphite substituent yields a phosphonate group, which on hydrolysis will yield a cation-exchange group. Introduction of either cation or anion-exchange groups into the substituted TFS and/or TFN monomer units, followed by oxidation of phosphite and subsequent hydrolysis of the phosphonate substituent, may yield TFS and/or TFN monomer units with more than one ion-exchange group per monomer unit, on average. As another example, the phosphine or phosphite substituent may be alkylated or benzylated to form an anion-exchange group. Further, employing the additional steps of nitration followed by conversion of the nitro group to an amino group, and subsequently to a quaternary ammonium salt may yield monomer units having two different anion-exchange groups. As yet another example, the thioether substituent may be converted to a sulfonate group by, for example, the method described in U.S. Pat. No. 5,830,962. Again, introduction of either cation or anion-exchange groups into the substituted TFS and/or TFN monomer units, followed by alkylation or benzylation of the phosphine, or conversion of thioether to sulfonate, may yield TFS and/or TFN monomer units with more than one ion-exchange group per monomer, on average, depending upon the compatibility of the chemistry involved. Thus, the present method allows for the preparation of amphoteric graft ion-exchange membranes, or graft ion-exchange membranes having two different ion-exchange groups, simply by choosing the appropriate ion-exchange group to be introduced into the substituted TFS and/or TFN monomer units.

In another embodiment of the present membranes and method, the substituted TFS and/or TFN monomers to be grafted contain a cyclic 2° or 3° amine or a heteroaromatic substituent containing at least one nitrogen heteroatom. These substituents are also activating with respect to the graft polymerization reaction. Following graft polymerization, the cyclic amine or heteroaromatic substituents can be N-alkylated or N-benzylated, forming anion-exchange sites in the grafted chains. Optionally, cation-exchange groups may also be introduced, either before or preferably after N-alkylation or N-benzylation, resulting in amphoteric ion-exchange membranes.

In any of the foregoing embodiments of the present membranes and method, sulfonate ion-exchange groups can be introduced to the monomer units in the grafted chains. For example, the membrane, preferably swollen with an appropriate solvent to facilitate sulfonation throughout its thickness, can be reacted with a solution of sulfur trioxide, or with sulfur trioxide vapor alone (or indeed an aerosol mist of sulfur trioxide). Other sulfonation reagents can be employd, as will be familiar to those skilled in the art, such as oleum and chlorosulfonic acid, for example.

While the foregoing methods have been described in relation to substituted TFS and/or TFN monomers, it will be readily apparent to those skilled in the art that the foregoing methods are readily adaptable to other monomers. It is anticipated that other vinyl monomers containing an aromatic ring may be suitably adaptable to the disclosed methods. For example, in the preparation of graft membranes employing styrenic monomers, it would still be advantageous to employ substituents that are activating with respect to the graft polymerization reaction, but which can be converted to de-activating substituents in subsequent reactions where it is desirable to introduce, for example, ion-exchange groups that may, by this process, be more stable under certain conditions. In addition to styrenic monomers, it is expected that the foregoing methods will be adaptable to substituted and unsubstituted monomers of the following basic structures:

where X can be H, F or Me and
if X=F, then Y=Z=H, or one of Y, Z is H and the other is F,
if X=H, then Y=Z=H, or one of Y, Z is H and the other is F, and
if X=Me, then Y=Z=H.

The following examples are for purposes of illustration and are not intended to limit the invention.

EXAMPLE 1

Grafting of Para-methyl-α,β,β-trifluorostyrene (p-Me-TFS) to Poly(ethylene-co-tetrafluoroethylene) (Tefzel®) Film A 2 mil (approx. 50 μm) thick 7 inch×7 inch (18 cm×18 cm) piece of poly(ethylene-co-tetrafluoroethylene) (Tefzel®) film was irradiated with a dose of 20 Mrad using a high energy electron beam (60 kW) radiation source, in an inert atmosphere. The irradiated base film was kept at −30° C. in an inert atmosphere prior to use. The irradiated membrane was then exposed to neat, degassed p-Me-TFS in an inert atmosphere at 80° C. for 24 hours. The p-Me-TFS grafted film was removed, washed with toluene and dried at 60° C. The percentage graft was 79%.

EXAMPLE 2

Grafting of Para-methyl-α,β,β-trifluorostyrene (p-Me-TFS) to Poly(ethylene-co-tetrafluoroethylene) (Tefzel®) Film A 2 mil (approx. 50 μm) thick 15 inch×15 inch (38 cm×38 cm) piece of poly (ethylene-co-tetrafluoroethylene) (Tefzel®) film was irradiated with a dose of 20 Mrad using a high energy electron beam (60 kW) radiation source, in an inert atmosphere. The irradiated base film was stored at −30° C. in an inert atmosphere prior to use. The irradiated membrane was then exposed to neat, degassed p-Me-TFS in an inert atmosphere at 70° C. for 3 hours. The p-Me-TFS grafted film was removed, washed with toluene and dried at 60° C. The percentage graft was 67%.

Comparative Example 3

Grafting of Para-methyl-α,β,β-trifluorostyrene (p-Me-TFS) and α,β,β-trifluorostyrene (TFS) to Poly (ethylene-co-tetrafluoroethylene) (Tefzel®) Film Samples of 2 inch×2 inch (5 cm×5 cm) pieces of poly (ethylene-co-tetrafluoroethylene) (Tefzel®) film were irradiated using a high energy electron beam (10 MeV) radiation source, in an inert atmosphere. The irradiated base films were kept at −30° C. in an inert atmosphere prior to use. Each irradiated base film was then exposed to either neat, degassed, p-Me-TFS or TFS in an inert atmosphere. The grafted films were then removed, washed with ethanol and vacuum dried overnight. Table 1 summarizes the grafting reaction conditions employed and the percentage graft attained for each grafted film.

TABLE 1

| Sample | Film thickness (μm) | Grafting Dose (Mrad) | Grafting Temperature (° C.) | Grafting Time (h) | Percentage Graft TFS | Percentage Graft p-Me-TFS |
|---|---|---|---|---|---|---|
| 1 | 50 | 20 | 50 | 24 | 31.8 | 62.8 |
| 2 | 50 | 20 | 80 | 2 | 33.9 | 42.9 |
| 3 | 50 | 40 | 50 | 24 | 40.7 | 79.2 |
| 4 | 50 | 40 | 80 | 2 | 43.4 | 58.1 |
| 5 | 25 | 20 | 50 | 24 | 27.7 | 54.7 |
| 6 | 25 | 20 | 80 | 2 | 29.9 | 37.4 |
| 7 | 25 | 40 | 50 | 24 | 34.7 | 69.7 |
| 8 | 25 | 40 | 80 | 2 | 37.1 | 49.9 |

As indicated in Table 1, under identical reaction conditions the percentage graft of the graft membrane samples incorporating substituted α,α,β-trifluorostyrene monomers (p-Me-TFS) was significantly higher than the percentage graft of the graft membrane samples incorporating TFS monomers. For example, the percentage graft of the p-Me-TFS samples was 25–35% greater than the percentage graft of the corresponding TFS samples after 2 hours and 95–100% greater after 24 hours.

EXAMPLE 4

Grafting of Para-methyl-α,β,β-trifluorostyrene (p-Me-TFS) to Poly(ethylene-co-tetrafluoroethylene) (Tefzel®) Film and Sulfonation of the Grafted Membrane (a) A 2 mil (approx. 50 μm) thick, 7 inch×7 inch (18 cm×18 cm) piece of poly(ethylene-co-tetrafluoroethylene) (Tefzel®) film was irradiated with a dose of 10 Mrad using a high energy electron beam (60 kW) radiation source, in an inert atmosphere. The irradiated base film was kept at −30° C. in an inert atmosphere prior to use. It was then exposed to neat, degassed, p-Me-TFS in an inert atmosphere at 50° C. for 60 hours. The p-Me-TFS grafted film was removed, washed with toluene and dried at 60° C. The percentage graft was 49%.

(b) A sulfonating solution was prepared by careful addition of 30 g of liquid sulfur trioxide to 70 g of 1,1,2,2-tetrachloroethane. The grafted membrane was sulfonated by immersion in the above-mentioned sulfonating solution for 2 hours at 70° C. The resultant ion-exchange membrane was washed with water and dried at 60° C. The equivalent weight of the sulfonated membrane was 660 g/mol, with a water content of 26% at room temperature.

EXAMPLE 5

Grafting of Para-methyl-α,β,β-trifluorostyrene (p-Me-TFS) to Poly(ethylene-co-tetrafluoroethylene) (Tefzel®) Film and Sulfonation of the Grafted Membrane (a) A 2 mil (approx. 50 μm) thick, 7 inch×7 inch (18 cm×18 cm) piece of poly(ethylene-co-tetrafluoroethylene) (Tefzel®) film was grafted with para-methyl-α, β,β-trifluorostyrene similarly as in Example 4, using a 5 Mrad irradiation dose. The percentage graft was 35%.

(b) The grafted film was sulfonated according to the procedure described in step (b) of Example 4. The equivalent weight of the sulfonated membrane was 821 g/mol, with a water content of 18% at room temperature.

EXAMPLE 6

Use of Sulfonated p-Me-TFS Grafted Poly (ethylene-co-tetrafluoroethylene) (Tefzel®) Membrane as an Ion-exchange Membrane in a Fuel Cell The membrane prepared as described in Example 4 was bonded to two catalyzed carbon fiber paper electrodes to form a membrane electrode assembly having a total platinum catalyst loading of 1 mg/cm$^2$. The membrane electrode assembly was tested in a Ballard Mark IV single cell fuel cell. The following operating conditions were employd:

Temperature: 80° C.

Reactant inlet pressure:
  3.02 bara for oxidant and fuel

Reactant stoichiometries:
  2.0 oxidant and 1.5 hydrogen.

Figure 1:
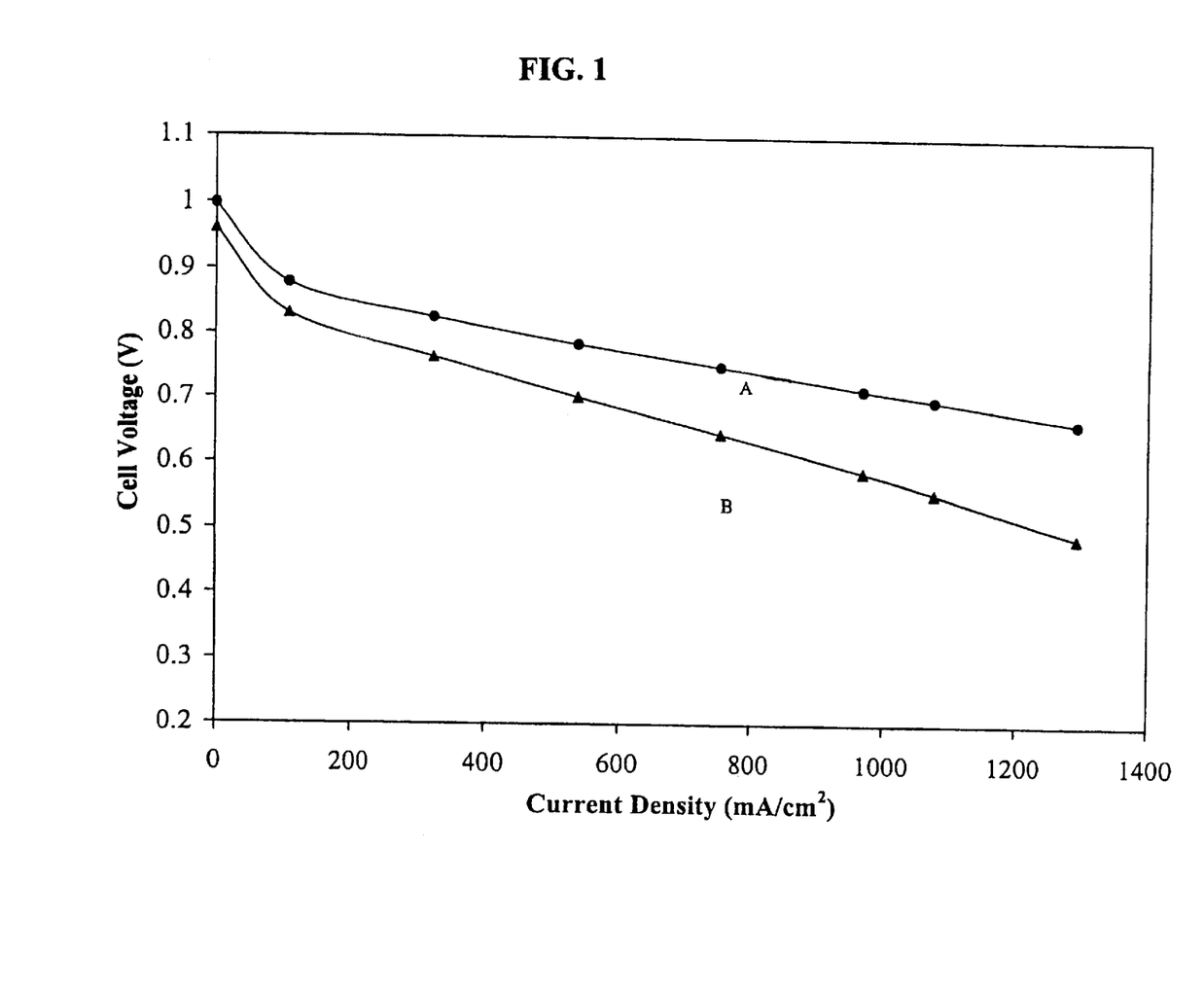
FIG. 1 is a plot of cell voltage as a function of current density (expressed in $mA/cm^2$) in an electrochemical fuel cell employing a sulfonated membrane of p-Me-TFS grafted poly(ethylene-co-tetrafluoroethylene) (Tefzel®) and operating on hydrogen-oxygen (plot A) and hydrogen-air (plot B).

FIG. 1 shows polarization plots of voltage as a function of current density for the sulfonated grafted membrane employed in a membrane electrode assembly in the electrochemical fuel cell operating on hydrogen-oxygen (plot A) and hydrogen-air (plot B).

EXAMPLE 7

Use of Sulfonated p-Me-TFS Grafted Poly (ethylene-co-tetrafluoroethylene) (Tefzel®) Membrane as an Ion-exchange Membrane in a Fuel Cell The membrane prepared as described in Example 5 was bonded to two catalyzed carbon fiber paper electrodes to form a membrane electrode assembly having a total platinum catalyst loading of 8 mg/cm$^2$. The membrane electrode assembly was tested in a Ballard Mark IV single cell direct methanol fuel cell. The following operating conditions were employd:

Temperature: 110° C.

Fuel: 0.4 M methanol solution (in water)

Reactant inlet pressure: 3.02 bara for oxidant and fuel

Reactant stoichiometries: 2.0 oxidant and 3.0 methanol.

Figure 2:
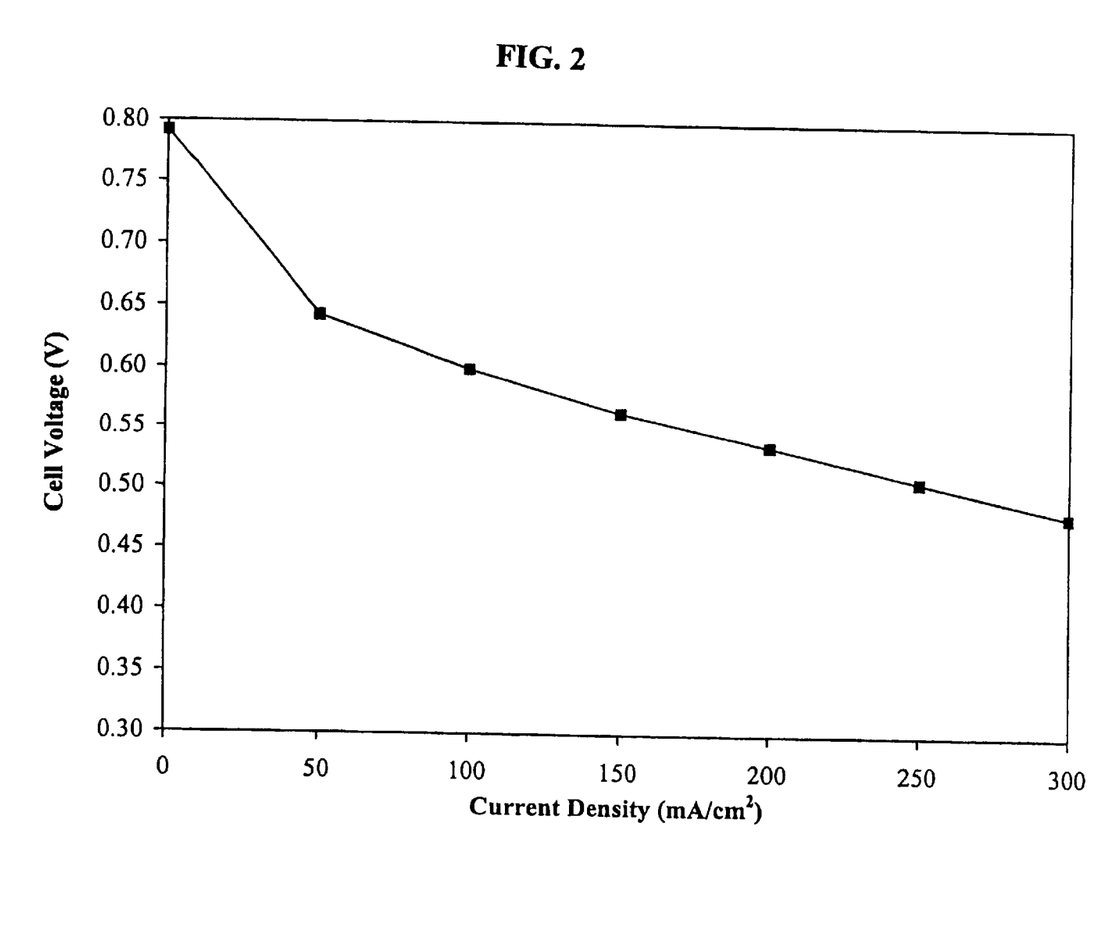
FIG. 2 is a plot of cell voltage as a function of current density (expressed in $mA/cm^2$) in an electrochemical direct methanol fuel cell employing a sulfonated membrane of p-Me-TFS grafted poly(ethylene-co-tetrafluoroethylene) (Tefzel®) operating on aqueous methanol-air.

FIG. 2 shows polarization plots of voltage as a function of current density for the sulfonated grafted membrane employed in a membrane electrode assembly in the electrochemical fuel cell operating on methanol-air.

In addition to the utility of the grafted membranes described herein in ion exchange membranes for electrochemical fuel cells, it is contemplated that such membranes will also have utility in the following applications:

(1) as membranes in filtration and ultrafiltration applications;

(2) as proton exchange membranes in water electrolysis, which involves a reverse chemical reaction to that employed in hydrogen/oxygen electrochemical fuel cells;

(3) as membranes in chloralkali electrolysis, which typically involves the electrolysis of a brine solution to produce chlorine and sodium hydroxide, with hydrogen as a by-product;

(4) as electrode separators in conventional batteries, provided the membrane has the requisite chemical inertness and high electrical conductivity;

(5) as ion-selective electrodes, particularly those employd for the potentiometric determination of a specific ion such as $Ca^{2+}$, $Na^+$, $K^+$ and like ions;

(6) as sensor materials for humidity sensors based on ion exchange membranes, as the electrical conductivity of an ion exchange membrane varies with humidity;

(7) as ion exchange membranes for separations by ion exchange chromatography—typical such applications are deionization and desalination of water, ion separations, removal of interfering ionic species, and separation and purification of biomolecules;

(8) as ion exchange membranes employed in analytical pre-concentration techniques (for example, Donnan Dialysis);

(9) as ion exchange membranes in electrodialysis, in which membranes are employed to separate components of an ionic solution under the driving force of an electrical current—industrial applications include desalination of brackish water, preparation of boiler feed make-up and chemical process water, de-ashing of sugar solutions, deacidification of citrus juices, separation of amino acids, and the like;

(10) as membranes in dialysis applications, in which solutes diffuse from one side of the membrane (the feed side) to the other side according to their concentration gradient—applications include hemodialysis and the removal of alcohol from beer;

(11) as membranes in gas separation (gas permeation) and pervaporation (liquid permeation) techniques; and (12) as bipolar membranes employed in water splitting and subsequently in the recovery of acids and bases from waste water solutions.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

What is claimed is:

1. A membrane comprising a polymeric base film with grafted chains comprising monomer units of formula (IV)

wherein $A_1$ is para-methyl and $A_2$ is hydrogen; and wherein at least a portion of said monomer units further comprise at least one ion-exchange substituent, thereby rendering said membrane an ion-exchange membrane.

2. The membrane of claim 1 wherein at least a portion of the grafted chains is crosslinked.

3. The membrane of claim 1 wherein said at least one ion-exchange substituent is selected from the group consisting of sulfonate and sulfonic acid.

4. The membrane of claim 1 wherein at least a portion of said monomer units comprise at least two ion-exchange substituents.

5. The membrane of claim 1 wherein at least 50% of said monomer units in said grafted chains have at least one ion-exchange substituent per monomer unit.

6. The membrane of claim 1 wherein said grafted chains comprise at least two different types of ion-exchange groups.

7. The membrane of claim 1 wherein said grafted chains comprise an anion-exchange group and a cation-exchange group.

8. The membrane of claim 1 wherein said membrane is substantially gas impermeable.

9. The membrane of claim 3 wherein said membrane is substantially gas impermeable.

10. The membrane of claim 1 wherein said base film comprises poly(ethylene-co-tetrafluoro-ethylene), and said at least one ion-exchange substituent is selected from the group consisting of a sulfonate group and a sulfonic acid group.

* * * * *